United States Patent
Shin et al.

(10) Patent No.: US 12,503,182 B2
(45) Date of Patent: Dec. 23, 2025

(54) SYSTEM AND METHOD FOR MANAGING SHARED PERSONAL MOBILITY DEVICE

(71) Applicants: Hyundai Motor Company, Seoul (KR); Kia Corporation, Seoul (KR)

(72) Inventors: Jae Dong Shin, Hwaseong-Si (KR); Yong Kyu Yoo, Yongin-Si (KR); Ho Kwon Na, Dangjin-Si (KR)

( * ) Notice: Subject to any disclaimer, the term of this patent is extended or adjusted under 35 U.S.C. 154(b) by 174 days.

(21) Appl. No.: 18/239,350

(22) Filed: Aug. 29, 2023

(65) Prior Publication Data
US 2024/0067287 A1 Feb. 29, 2024

(30) Foreign Application Priority Data
Aug. 31, 2022 (KR) .................. 10-2022-0110064

(51) Int. Cl.
| | |
|---|---|
| *B60B 9/00* | (2006.01) |
| *B62H 3/02* | (2006.01) |
| *B62M 6/80* | (2010.01) |
| *H04W 64/00* | (2009.01) |
| *B62H 3/00* | (2006.01) |

(52) U.S. Cl.
CPC .............. *B62H 3/02* (2013.01); *B62M 6/80* (2013.01); *H04W 64/003* (2013.01); *B62H 2003/005* (2013.01)

(58) Field of Classification Search
CPC .............. B62H 3/02; B62H 2003/005; B62H 2700/00; B62M 6/80; H04W 64/003; H04W 4/029; H04W 4/38; G06Q 10/087; G06Q 30/0645; G06Q 50/26; G06Q 50/40; G07F 17/0057; B62K 3/002; B60L 2200/24

USPC ...................................................... 340/286.02
See application file for complete search history.

(56) References Cited

U.S. PATENT DOCUMENTS

| | | | | |
|---|---|---|---|---|
| 7,898,439 | B2 * | 3/2011 | Bettez ................ | G07F 17/10 340/432 |
| 10,277,592 | B2 * | 4/2019 | Saka .................. | G06F 21/44 |
| 10,322,761 | B2 * | 6/2019 | Xie .................... | B62H 5/005 |
| 10,991,250 | B1 * | 4/2021 | Arnold .............. | G06Q 50/40 |
| 12,209,437 | B2 * | 1/2025 | Askin ................ | B62H 5/20 |
| 2012/0239248 | A1 * | 9/2012 | Bobbitt ............. | G08G 1/127 701/1 |

(Continued)

FOREIGN PATENT DOCUMENTS

| | | | | |
|---|---|---|---|---|
| EP | 4089444 | A1 * | 11/2022 | .......... B62H 5/20 |
| JP | 2015-113686 | A | 6/2015 | |

(Continued)

*Primary Examiner* — Tai T Nguyen
(74) *Attorney, Agent, or Firm* — Banner & Witcoff, Ltd.

(57) ABSTRACT

Disclosed are a system and method for managing a shared personal mobility device (SPM) capable of acquiring accurate location information of the SPM. The system for managing the SPM may include a dock configured to store SPMs, and an SPM management server configured to receive, from the dock and using an LPWA protocol, state information associated with the doc. The state information may include coordinates of the dock. The SPM management server may be further configured to receive location information associated with a returned SPM, and update, based on the coordinates of the dock, the location information associated with the returned SPM.

20 Claims, 7 Drawing Sheets

(56) References Cited

U.S. PATENT DOCUMENTS

| | | | |
|---|---|---|---|
| 2015/0074004 A1* | 3/2015 | Song | G07C 9/00896 |
| | | | 705/307 |
| 2017/0337622 A1* | 11/2017 | Denais | G06Q 30/04 |
| 2019/0228466 A1* | 7/2019 | Kojima | G06Q 30/0645 |
| 2020/0410375 A1* | 12/2020 | Seagraves | B62H 3/00 |
| 2021/0107579 A1 | 4/2021 | Adam et al. | |

FOREIGN PATENT DOCUMENTS

| KR | 10-2020-0062475 A | 6/2020 |
|---|---|---|
| KR | 102150807 B1 | 9/2020 |
| KR | 102291305 B1 | 8/2021 |
| KR | 102429527 B1 | 8/2022 |
| WO | 2011/031078 A2 | 3/2011 |

\* cited by examiner

SYSTEM AND METHOD FOR MANAGING SHARED PERSONAL MOBILITY DEVICE

CROSS-REFERENCE TO RELATED APPLICATIONS

This application claims the benefit of Korean Patent Application No. 10-2022-0110064, filed on Aug. 31, 2022, which is hereby incorporated by reference in its entirety.

BACKGROUND OF THE INVENTION

Field

The present disclosure relates to a system and method for managing a shared personal mobility device, and more particularly, to a system and method for managing a shared personal mobility device capable of acquiring accurate location information of the shared personal mobility device.

Discussion of the Related Art

As a means of transportation, the proportion of traditional vehicles has been decreasing, and the proportion of personal mobilities (PMs) has been increasing. Here, the PM is a moving body designed for transporting 1 or 2 people, and refers to a moving means including an electric scooter, a bike, a smart car, a vehicle, a purpose-built vehicle (PBV), an air vehicle, etc.

Meanwhile, as the number of users of PMs has been increasing, and types of PMs have been diversified, the number of users of a PM sharing service for rental and using the PMs for a certain period time has been increasing. When the PM sharing service is used, a PM may be used at a desired time and place without a user having to have an ownership of the PM, and thus a user may conveniently use the PM. Hereinafter, the shared personal mobility device will be referred to as an "SPM."

The PM sharing service may be divided into a method of providing an SPM in a designated place and a method of providing an SPM in any place.

First, in a service in which an SPM is provided at a designated place, the user may rent or return the SPM at a designated place. However, a downside of this method is decreased accessibility to an SPM sharing service for users.

On the other hand, in a service in which the SPM is provided at an arbitrary place other than a designated place, the user may rent or return the SPM at an arbitrary location such as a roadside or an alley. This service is referred to as a dock-less PM sharing service.

In the dock-less PM sharing service, the SPM may be returned at any place. However, a difficulty with this approach is that the PMs may interfere with pedestrian traffic on sidewalks and that maintenance and management are difficult.

Specifically, in the dock-less PM sharing service, when the SPM is left unattended for a long period of time, other users may not be able to use the SPM. In addition, another problem might be that it is difficult to verify whether the SPM is actually left unattended.

A global navigation satellite system (GNSS) based on satellite signals may be used to determine a location of the SPM. An example of the GNSS is a global positioning system (GPS). Vehicle-to-everything (V2X) standard technology applied to intelligent transportation systems may estimate a location of a vehicle based on the GPS.

However, in an urban area having lots of skyscrapers, GPS signals may be diffused when reflected by the skyscrapers. Reflective GPS signal diffusion may inhibit a GPS signal from being transmitted to a destination in the shortest distance, thereby reducing the accuracy of positioning. In addition, in a GPS dead zone such as an indoor parking lot, it is difficult to receive a satellite signal, and thus it is more difficult to determine the location of the SPM, which makes it difficult to determine whether the PM is left unattended or to manage power of the SPM.

When the user views and visits a location displayed on an application for SPM use in order to use the SPM, there may occur a case in which the SPM is not actually found at the shown location due to a GPS error, causing inconvenience. In addition, when an SPM operator attempts to retrieve the SPM, it may be difficult to locate the SPM due to a GPS error.

Therefore, when the SPM is managed, it is necessary to accurately determine the location of the SPM.

SUMMARY

Accordingly, the present disclosure is directed to a system and method for managing an SPM that substantially obviate one or more problems due to limitations and disadvantages of the related art.

An object of the present disclosure is to provide a system and method for managing an SPM capable of accurately representing current location information of the SPM.

Another object of the present disclosure is to provide a system and method for managing an SPM capable of reducing management cost using a low power wide area (LPWA) protocol.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a system may include a dock configured to store one or more shared personal mobility devices (SPMs), and an SPM management server configured to receive, from the dock and using a low power wide area (LPWA) communication protocol, state information associated with the dock. The state information may include coordinates of the dock. The SPM management server may be further configured to location information associated with a returned SPM, and update, based on the coordinates of the dock, the location information associated with the returned SPM.

The dock may include: one or more sensors configured to sense whether one or more SPMs is stored at the dock; a communication interface configured to communicate with the SPM management server; and a controller configured to control the communication interface to transmit the state information associated with the dock to the SPM management server.

Each of the one or more sensors may include a proximity sensor configured to detect an object within one meter.

The proximity sensor may include at least one of: an infrared sensor, a laser sensor, an ultrasound sensor, a metal sensor, or a Hall sensor.

The LPWA protocol may include at least one of: a long range (LoRa) protocol, a Long-Term Evolution Machine Type Communication (LTE-M) protocol, or a Narrowband Internet of things (NB-IoT) protocol.

The communication interface may be configured to transmit sensor information, of each of the one or more sensors, to the SPM management server at an interval of time of less than 10 seconds.

The SPM management server may be configured to receive the location information using a crawling scheme.

The SPM management server may be configured to receive the location information from an SPM operator using an application programming interface (API).

According to one or more embodiments of the present disclosure, a method may include receiving, by a shared personal mobility device (SPM) management server, sensor information from a dock storing one or more shared personal mobility devices (SPMs). The sensor information may include coordinates of the dock. The method may further include receiving, by the SPM management server, location information associated with a returned SPM, and updating, by the SPM management server and based on the coordinates of the dock, the location information associated with the returned SPM.

Receiving the location information may be performed using a crawling scheme.

Receiving the location information may include receiving, using an application programming interface (API), the location information from an SPM operator.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

With regard to embodiments of the present disclosure disclosed in the text, specific structural or functional descriptions are only illustrated for the purpose of describing the embodiments of the present disclosure, and the embodiments of the present disclosure may be implemented in various forms. The present disclosure should not be construed as being limited to the described embodiments.

Since the present disclosure may have various changes and may have various forms, specific embodiments are illustrated in the drawings and described in detail in the text. However, the present disclosure is not intended to be limited to the specific disclosed form, and it should be understood to include all modifications, equivalents and substitutes included in the spirit and scope of the present disclosure.

Although terms such as "first," "second," etc., may be used herein to describe various elements, the elements are not limited by these terms. These terms are only used to distinguish one element from another. For example, without departing from the scope of the present disclosure, a first element may be referred to as a second element, and similarly, the second element may be referred to as the first element.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween. Other expressions describing a relationship between elements, such as "between" and "immediately between," "adjacent to" and "directly adjacent to," etc., should be interpreted similarly.

A term used herein is used to describe a particular embodiment, and is not intended to limit the present disclosure. A singular expression includes the plural form unless the context clearly dictates otherwise. In the present specification, it should be understood that a term such as "include" or "have" is intended to designate that the features, numbers, steps, operations, elements, parts, or combinations thereof disclosed herein are present, and does not preclude the possibility of addition or presence of one or more other features, numbers, steps, operations, elements, parts, or combinations thereof.

Unless defined otherwise, all terms used herein, including technical or scientific terms, have the same meanings as commonly understood by those skilled in the art to which this disclosure pertains. Terms such as those defined in commonly used dictionaries should be interpreted as indicating meanings consistent with the meanings in the context of the related art, and should not be interpreted in an ideal or excessively formal way unless explicitly defined in the present application.

Meanwhile, when some embodiments are differently implemented, functions or operations specified in a specific block may be performed in the order different from that specified in a flowchart. For example, two continuous blocks may actually be performed at the same time, or the blocks may be inversely performed depending on the related functions or operations.

Hereinafter, a system and method for managing an SPM according to the present disclosure will be described with reference to the accompanying drawings.

Figure 1:
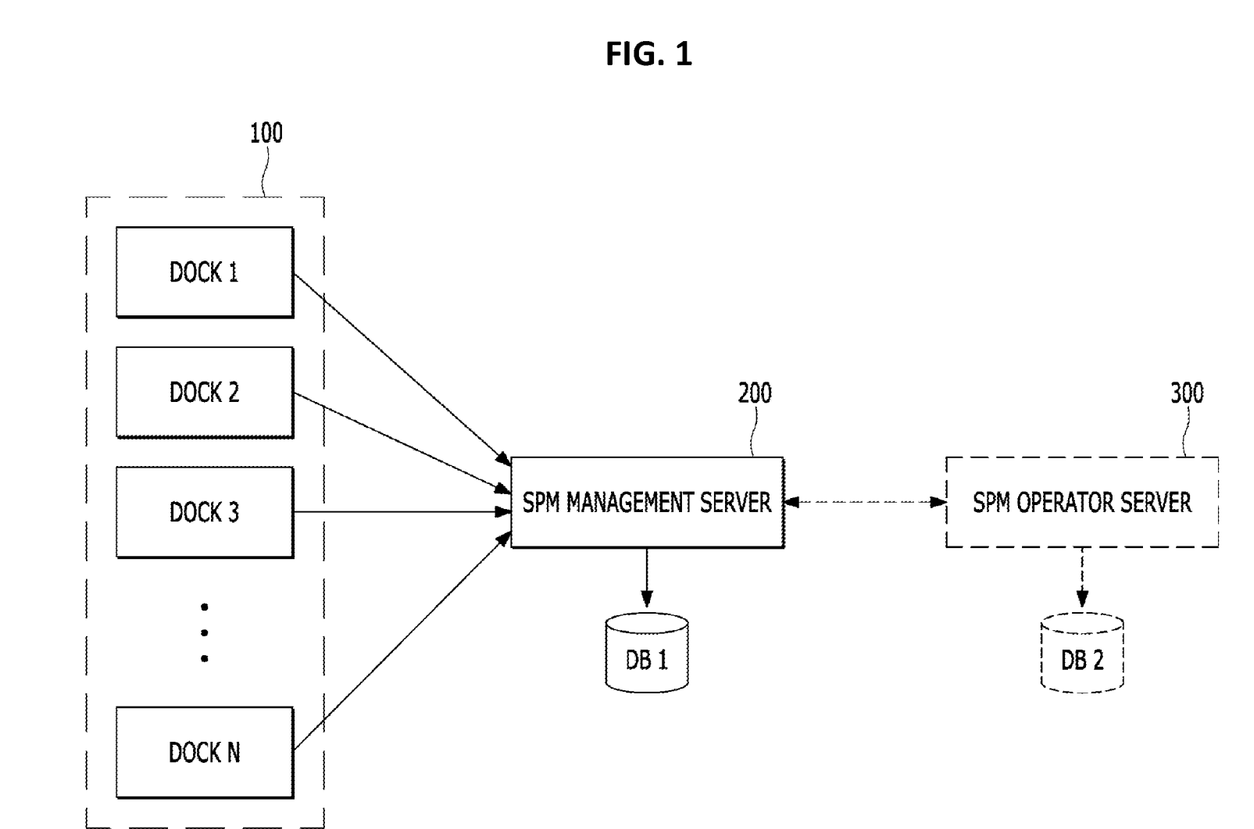
FIG. 1 is a diagram schematically illustrating a configuration of an SPM management system.

FIG. 1 is a diagram schematically illustrating a configuration of an SPM management system according to the present disclosure. As illustrated in the figure, the SPM management system may include a plurality of docks 100 and an SPM management server 200. The SPM management server 200 may collect each piece of SPM location information from each SPM operator server 300 substantially in real time (e.g., having a guaranteed minimum response time) using an API. Each of the docks 100 may transmit state information of the respective dock to the SPM management server 200 periodically (e.g., at intervals in units of predetermined times).

Figure 2:
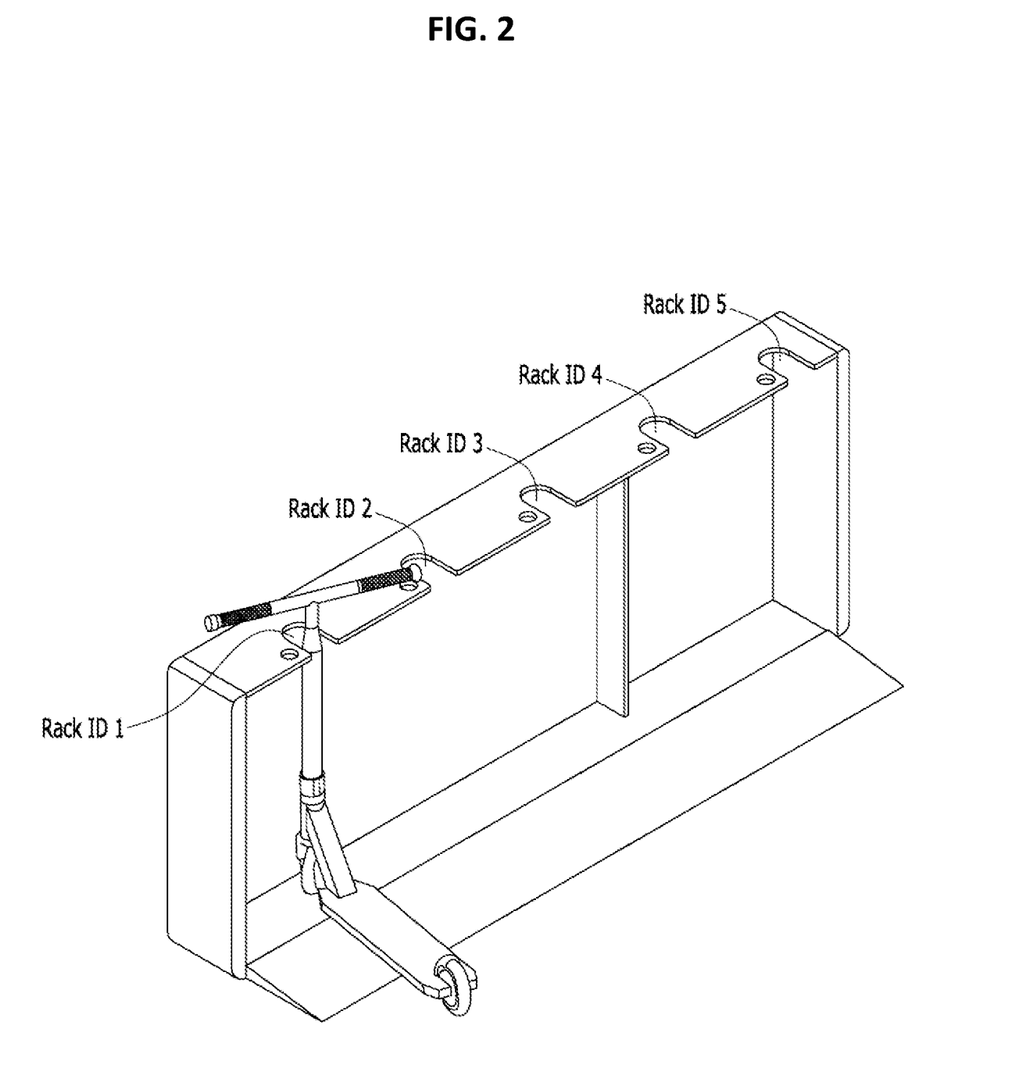
FIG. 2 is a diagram of a dock used in the SPM management system.

As illustrated in FIG. 2, one or more racks (e.g., receptacles, storage spaces) capable of holding (e.g., storing, housing, securing, etc.) one or more SPMs may be disposed on each of the docks 100. Each rack may have unique identification information (identity: ID). The SPM management server 200 may collect each piece of SPM location information from each SPM operator server 300 in real time by executing the API.

Figure 3:
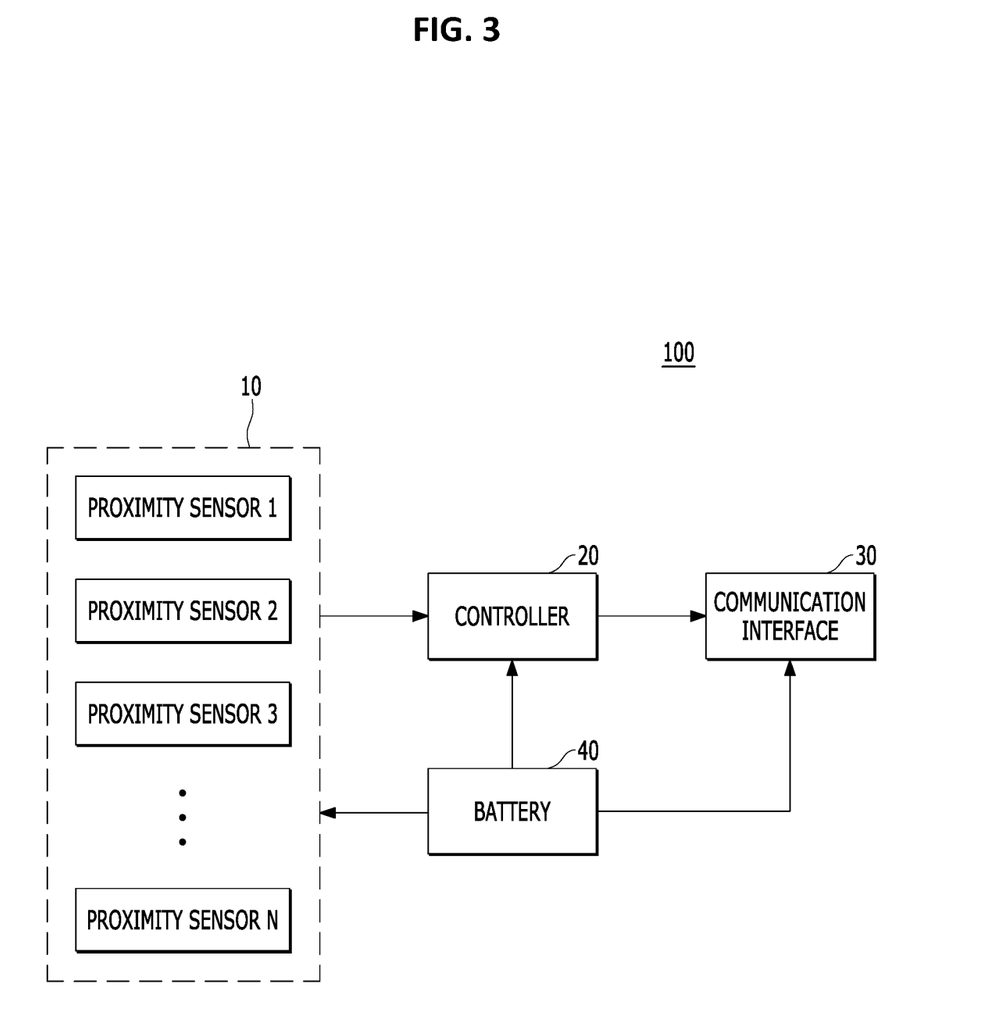
FIG. 3 is a block diagram schematically illustrating a configuration of the dock in the SPM management system.

FIG. 3 is a block diagram schematically illustrating a configuration of a dock in the SPM management system according to the present disclosure. The dock 100 includes a sensor unit 10 including a plurality of proximity sensors, a controller 20, a communication interface (e.g., a communication unit) 30, and a battery 40. The battery 40 supplies operating power to the sensor unit 10, the controller 20, and the communication unit 30.

The sensor unit 10 includes the plurality of proximity sensors disposed on the respective racks of the dock 100 to sense a storage state of the SPM. The proximity sensors may detect objects within tens of centimeters (e.g., within one meter). Each of the proximity sensors may be configured as any one of an infrared sensor, a laser sensor, an ultrasound sensor, a metal sensor, and a Hall sensor. The proximity sensor has an on state or off state depending on whether the SPM is held.

The controller 20 performs a control operation to transmit the state information of the dock 100 storing the SPM to the SPM management server 200 through the communication unit 30.

The communication unit 30 communicates with the SPM management server 200 using an LPWA scheme. LPWA is a communication scheme (e.g., protocol) used for gas, water, environmental monitoring, etc., and may transmit information to the SPM management server without any expensive electric construction. The LPWA scheme in the present embodiment may be configured as any one of Long Range (LoRa), Long-Term Evolution Machine Type Communication (LTE-M, or otherwise known as Cat-M1), and Narrowband Internet of things (NB-IoT, or otherwise known as Cat-M2).

The controller 20 performs a control operation to transmit state information of each sensor unit 10 disposed on the dock 100 to the SPM management server 200 at an interval of time of less than 10 seconds.

Figure 4:
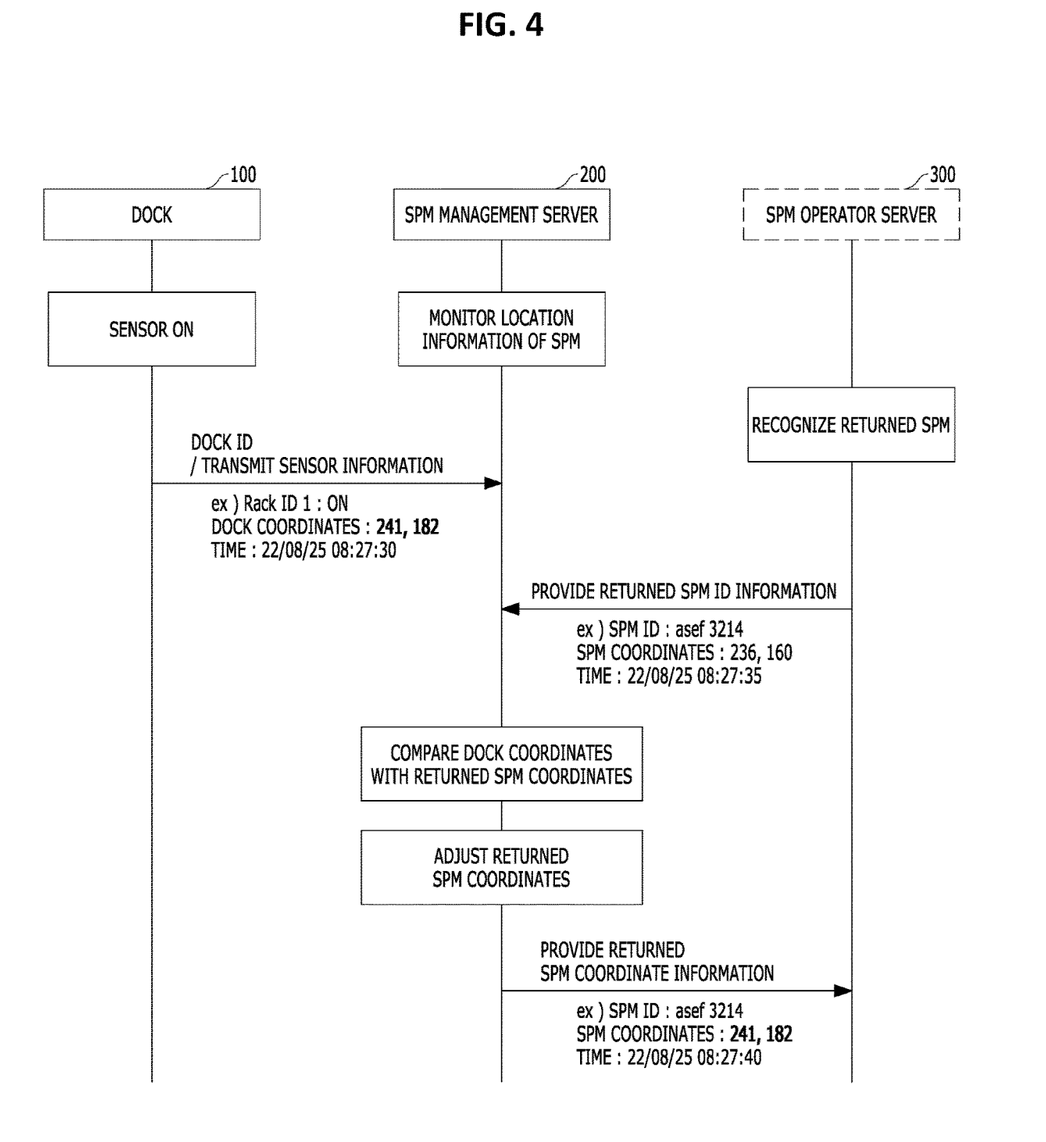
FIG. 4 is a diagram illustrating an operation process of an SPM management method.

FIG. 4 is a diagram illustrating an operation process of an SPM management method according to the present disclosure. If the user having finished using the SPM places the SPM on the rack of the dock 100, the proximity sensor installed on the rack of the dock 100 detects the holding, and state information of the proximity sensor indicates an on state. The controller 20 of the dock 100 performs a control operation to transmit sensor information together with a rack ID of the dock to the SPM management server 200 through the communication unit 30. For example, the information transmitted to the SPM management server 200 includes rack ID state information (Rack ID 1: ON), absolute coordinate (241, 182) information of the dock, and a transmission time (22/08/25 08:27:30). The transmitted information is stored in a database DB 1 connected to the SPM management server 200.

The SPM management server 200 monitors location information of the SPM in real time. That is, SPM location information of an SPM application is crawled and collected substantially in real time (e.g., having a guaranteed minimum response time) or periodically at regular intervals using a crawling scheme.

Figure 5:
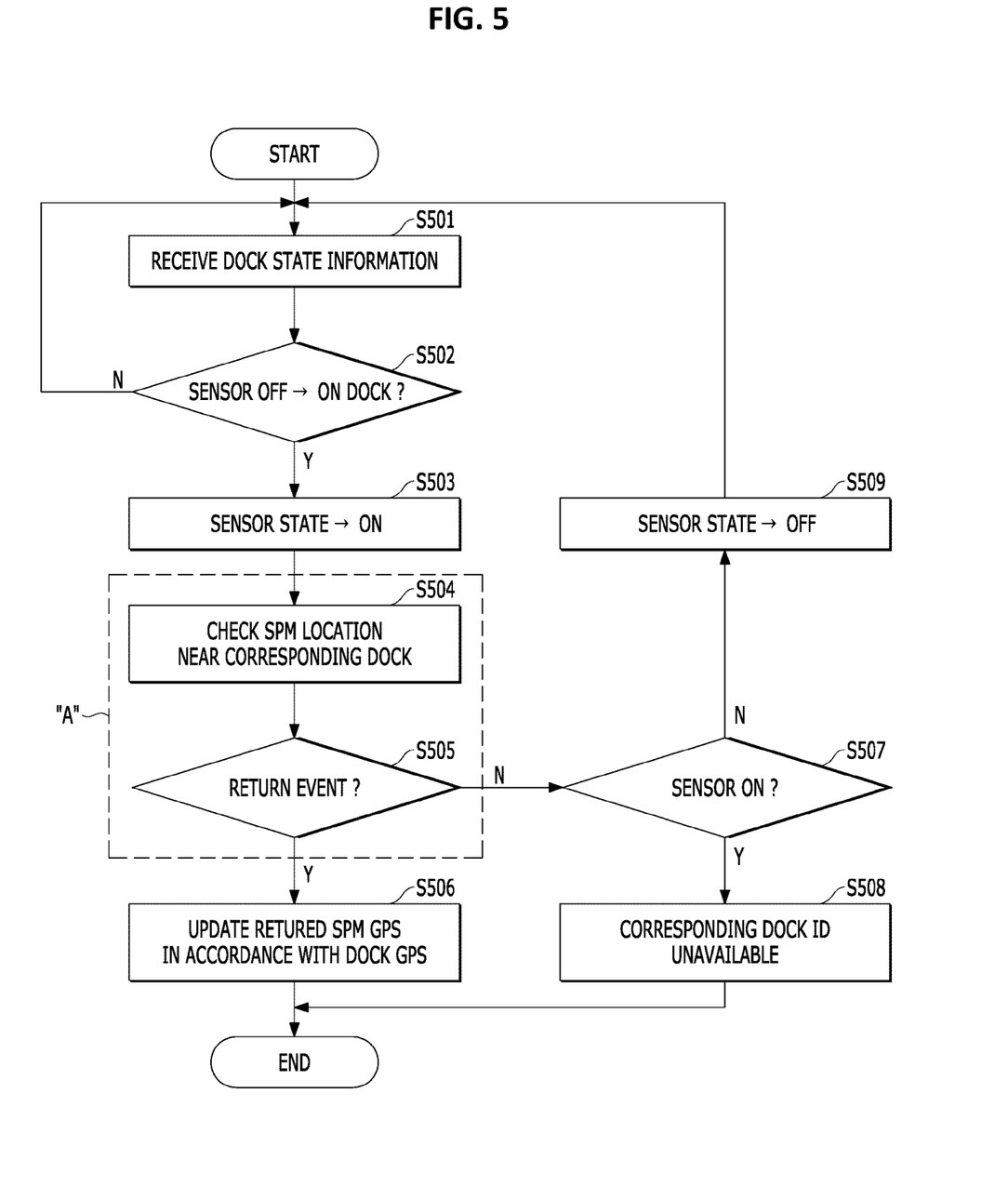
FIG. 5 is a diagram illustrating a progress process of the SPM management method.

FIG. 5 is a diagram illustrating a progress process of the SPM management method according to the present disclosure.

The SPM management server 200 receives dock state information transmitted from the communication unit of each dock 100 at predetermined intervals. Preferably, the SPM management server 200 receives the information at an interval of time of less than 10 seconds (S501).

The dock state information includes whether sensing of the proximity sensor 10 disposed on each rack has been performed, that is, on state or off state information, and ID information of the corresponding rack. It is obvious that, since the SPM management server 200 manages several docks, unique identification information including location information (e.g., absolute coordinates (GPS)) of the dock is additionally transmitted (S502).

The SPM management server 200 verifies whether the received dock state information is changed to a sensor on state, and stores the information in the database (S503).

The SPM management server 200 recognizes that the SPM is held on an arbitrary rack of an arbitrary dock 100 and performs a process "A" for checking unique information of the corresponding SPM. That is, the crawling scheme or the API is used to check information of an SPM near the corresponding dock (S504), and it is determined whether a return event has occurred (S505).

If the event occurs, the SPM management server 200 compares the location information (GPS) of the SPM returned to the corresponding dock with absolute location coordinates (GPS) of the dock. If the value is within an error range, the SPM management server 200 corrects the location information (GPS) of the returned SPM to the absolute location coordinates (GPS) of the dock. If the error range is exceeded, the crawling scheme or the API may be used to determine that the acquired location information of the returned SPM is inaccurate (S506).

A new user may use a returned SPM as soon as the user returns the SPM to the dock. In consideration of this case, it is determined whether the corresponding sensor maintains an ON state for a predetermined time, for example, 30 seconds or more (S507).

If the predetermined time (e.g., 30 seconds) has not elapsed, it is determined that the SPM has been released from the rack of the corresponding dock, and this information is stored in the database (S509).

On the other hand, if the ON state is maintained for 30 seconds or more, information indicating that the rack ID of the corresponding dock is unavailable in the database (S508).

Figure 6:
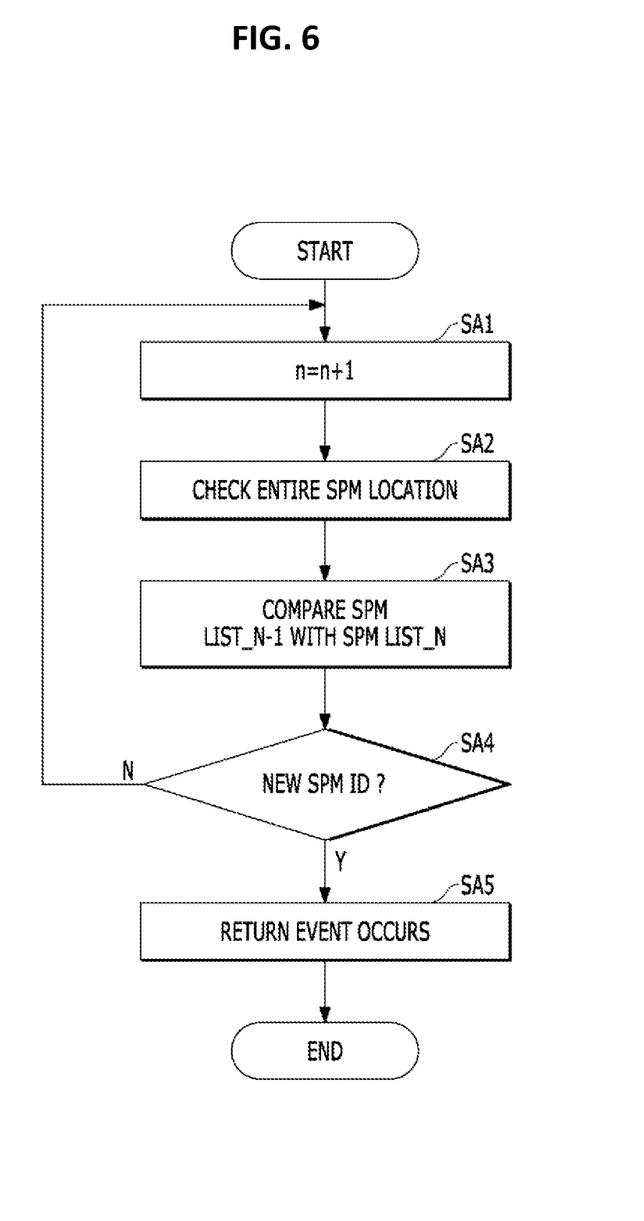
FIG. 6 is a flowchart illustrating a process of checking occurrence of a return event in an SPM management server.

FIG. 6 is a flowchart illustrating a process of checking occurrence of a return event in the SPM management server according to the present disclosure.

The SPM management server 200 verifies whether a return event has occurred in order to identify the returned SPM. First, the SPM management server 200 checks the entire SPM location using each rack ID of a plurality of docks to be managed and state information of the corresponding rack at predetermined time intervals (SA1 and SA2). An (n−1)-th SPM list stored in the database is compared with a current SPM list, that is, an n-th SPM list (SA3), and if the SPM lists do not match each other (e.g., different from each other), it is possible to recognize that the SPM has been returned or that a new user has used the SPM.

If the sensor of the dock recognizes a state in which the SPM is held (SA4), the crawling scheme or the API is used to acquire information about a returned SPM near the dock, and to confirm that a return event has occurred.

Figure 7:
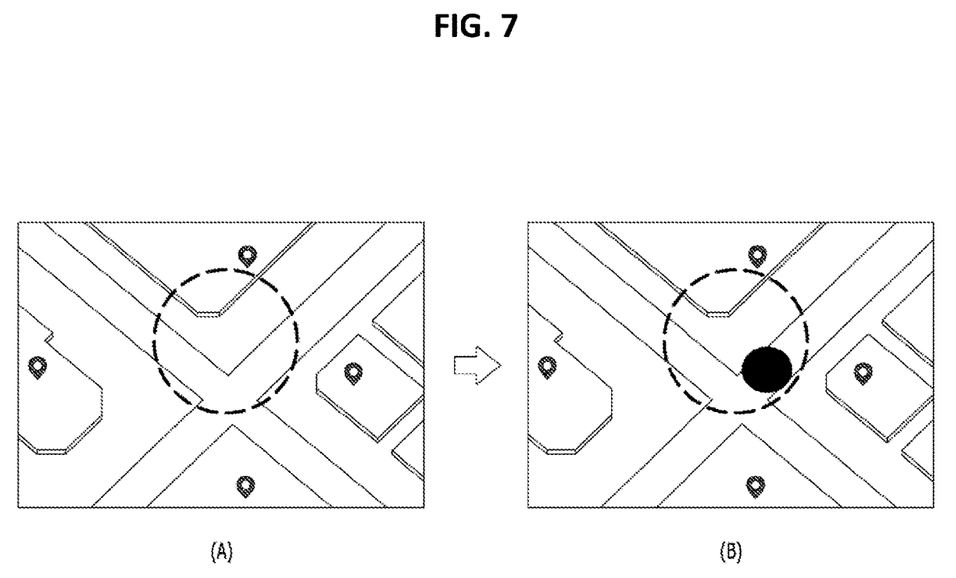
FIG. 7 is a diagram illustrating acquisition of returned SPM information in a server of the SPM management system.

As illustrated in FIG. 7, the SPM management server 200 may use the API every 30 seconds to acquire returned SPM location information from the SPM operator server 300 in real time. That is, if a return event occurs in the dock installed in a marked place as illustrated in FIG. 7(A), it is possible to confirm that the returned SPM is present in the corresponding place as illustrated in FIG. 7(B).

For example, the SPM information includes the return SPM ID (SPM ID: asef3214), the current location coordinates (236, 160), and the acquisition time (22/08/25 08:27:35) information.

If a predetermined sensor of the dock maintains an ON state for 30 seconds, the SPM management server 200 recognizes that a rack of the dock on which the corresponding sensor is disposed is unavailable. If a new SPM user separates the SPM from the rack to use the SPM, a proximity sensor of the corresponding rack is turned off, and the SPM management server 200 recognizes that the corresponding rack is a rack to which the SPM may be returned.

The SPM management server 200 performs matching (e.g., synchronizing, updating) with a dock near coordinates of the returned SPM using information received from the dock and return SPM information acquired from the outside. In this instance, the coordinates of the returned SPM are compared with coordinates of the dock. If the coordinates do not match (e.g., coincide with) each other, the coordinates of the returned SPM are adjusted in accordance with absolute coordinates of the dock and provided to the SPM operator server 300. Therefore, accurate SPM coordinate information may be stored in a database DB 2 connected to the SPM operator server 300.

The system and method for managing the SPM according to the present disclosure may acquire accurate location information of the SPM. Therefore, a return method using a dock may be induced, and usability may be improved by applying the system and method to an existing SPM or bicycle dock since the user does not have to wander to find the SPM. In addition, the SPM operator does not have to wander to find the returned SPM, and thus operating costs may be reduced.

The system and method for managing the SPM according to the present disclosure may identify an accurate location of the SPM by causing the SPM to be returned to the dock. In addition, it is possible to reduce SPM operating costs by using the LPWA scheme.

Even though description has been given above with reference to the preferred embodiments of the present disclosure, those skilled in the art may understand that the present disclosure can be variously modified and changed within the scope without departing from the spirit and scope of the present disclosure described in the claims below.

What is claimed is:

1. A system comprising:
   a dock configured to store one or more shared personal mobility devices (SPMs); and
   an SPM management server configured to:
     receive, from the dock using a low power wide area (LPWA) communication protocol, state information associated with the dock, wherein the state information comprises coordinates of the dock;
     receive, from an SPM operator server, location information associated with a returned SPM;
     compare the state information of the dock and the location information associated with the returned SPM; and
     update, based on the coordinates of the dock, the location information associated with the returned SPM in a database connected to the SPM operator server.

2. The system according to claim 1, wherein the dock comprises:
   one or more sensors configured to sense whether one or more SPMs is stored at the dock;
   a communication interface configured to communicate with the SPM management server; and
   a controller configured to control the communication interface to transmit the state information associated with the dock to the SPM management server.

3. The system according to claim 2, wherein each of the one or more sensors comprise a proximity sensor configured to detect an object within one meter.

4. The system according to claim 3, wherein the proximity sensor comprises at least one of: an infrared sensor, a laser sensor, an ultrasound sensor, a metal sensor, or a Hall sensor.

5. The system according to claim 2, wherein the communication interface is configured to transmit sensor information, of each of the one or more sensors, to the SPM management server at an interval of time of less than 10 seconds.

6. The system according to claim 1, wherein the LPWA protocol comprises at least one of: a long range (LoRa) protocol, a Long-Term Evolution Machine Type Communication (LTE-M) protocol, or a Narrowband Internet of things (NB-IoT) protocol.

7. The system according to claim 1, wherein the SPM management server is configured to receive the location information using a crawling scheme.

8. The system according to claim 1, wherein the SPM management server is configured to receive the location information from an SPM operator using an application programming interface (API).

9. The system according to claim 1, wherein the state information further comprises:
   a state indicator of a rack identifier of the dock, wherein the state indicator indicates a returned state of a sensed SPM; and
   first time information associated with a returned time of the sensed SPM, and
   wherein the coordinates of the dock comprises absolute coordinates of the dock.

10. The system according to claim 9, wherein the SPM management server is configured to receive the location information associated with the returned SPM by:
    receiving, from the SPM operator server, a return notification associated with the returned SPM, wherein the return notification associated with the returned SPM comprises:
      an SPM identifier of the returned SPM;
      the location information associated with the returned SPM; and
      second time information associated with a returned time of the returned SPM,
      wherein the location information associated with the returned SPM comprises information of second coordinates, and
      wherein a difference between the absolute coordinates of the dock and the second coordinates is within a threshold difference.

11. The system according to claim 10, wherein the SPM management server is configured to update the location information by:
  correcting the location information associated with the returned SPM with the absolute coordinates of the dock in the database connected to the SPM operator server.

12. The system according to claim 1, wherein the SPM management server is configured to:
  receive second sensor information from a second dock, wherein the second sensor information comprises:
    a second state indicator of a second rack identifier of the second dock, wherein the second state indicator indicates a returned state of a second sensed SPM;
    second time information associated with a returned time of the second sensed SPM; and
    the coordinates of the second dock;
  compare the second sensor information of the second dock and at least one location information received from the SPM operator server; and
  based on a time duration associated with the second state indicator being greater than a threshold time duration, determine that a rack of the second dock corresponding to the second rack identifier is unavailable.

13. A method comprising:
  receiving, by a shared personal mobility device (SPM) management server, sensor information from a dock storing one or more shared personal mobility devices (SPMs), wherein the sensor information comprises coordinates of the dock;
  receiving, by the SPM management server from an SPM operator server, location information associated with a returned SPM;
  comparing the sensor information of the dock and the location information associated with the returned SPM; and
  updating, by the SPM management server and based on the coordinates of the dock, the location information associated with the returned SPM in a database connected to the SPM operator server.

14. The method according to claim 13, wherein the receiving of the location information is performed using a crawling scheme.

15. The method according to claim 13, wherein the receiving of the location information comprises receiving, using an application programming interface (API), the location information from an SPM operator.

16. The method according to claim 13, wherein the sensor information further comprises:
  a state indicator of a rack identifier of the dock, wherein the state indicator indicates a returned state of a sensed SPM; and
  first time information associated with a returned time of the sensed SPM, and
  wherein the coordinates of the dock comprises absolute coordinates of the dock.

17. The method according to claim 16, wherein the receiving of the location information associated with the returned SPM comprises:
  receiving, by the SPM management server from the SPM operator server, a return notification associated with the returned SPM, wherein the return notification associated with the returned SPM comprises:
    an SPM identifier of the returned SPM;
    the location information associated with the returned SPM; and
    second time information associated with a returned time of the returned SPM,
  wherein the location information associated with the returned SPM comprises information of second coordinates, and
  wherein a difference between the absolute coordinates of the dock and the second coordinates is within a threshold difference.

18. The method according to claim 17, wherein the updating of the location information comprises:
  correcting, by the SPM management server, the location information associated with the returned SPM with the absolute coordinates of the dock in the database connected to the SPM operator server.

19. The method according to claim 16, further comprising:
  receiving, by the SPM management server, second sensor information from a second dock, wherein the second sensor information comprises:
    a second state indicator of a second rack identifier of the second dock, wherein the second state indicator indicates a returned state of a second sensed SPM;
    second time information associated with a returned time of the second sensed SPM; and
    the coordinates of the second dock.

20. The method according to claim 19, further comprising:
  comparing the second sensor information of the second dock and at least one location information received from the SPM operator server; and
  based on a time duration associated with the second state indicator being greater than a threshold time duration, determining that a rack of the second dock corresponding to the second rack identifier is unavailable.

* * * * *